(12) United States Patent
Tohyama et al.

(10) Patent No.: US 7,276,698 B2
(45) Date of Patent: Oct. 2, 2007

(54) THERMAL-TYPE INFRA-RED RAY SOLID-STATE IMAGE SENSOR AND METHOD OF FABRICATING THE SAME

(75) Inventors: Shigeru Tohyama, Tokyo (JP); Seiji Kurashina, Kanagawa (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 11/085,183

(22) Filed: Mar. 22, 2005

(65) Prior Publication Data
US 2005/0218326 A1 Oct. 6, 2005

Related U.S. Application Data

(63) Continuation-in-part of application No. 10/960,052, filed on Oct. 8, 2004.

(30) Foreign Application Priority Data

Oct. 9, 2003 (JP) ............................. 2003-350430

(51) Int. Cl.
  G01J 5/00 (2006.01)
  G01T 1/24 (2006.01)
(52) U.S. Cl. ................. 250/338.1; 250/370.08
(58) Field of Classification Search ............. 250/338.1, 250/338.3, 338.4, 330, 332, 370.08; 257/417, 257/426
See application file for complete search history.

(56) References Cited

U.S. PATENT DOCUMENTS

| | | | | |
|---|---|---|---|---|
| 6,034,374 A | * | 3/2000 | Kimura et al. | 250/370.08 |
| 6,236,046 B1 | * | 5/2001 | Watabe et al. | 250/338.1 |
| 6,448,557 B2 | * | 9/2002 | Oda | 250/338.3 |
| 2002/0040967 A1 | * | 4/2002 | Oda | 250/338.1 |
| 2003/0205670 A1 | * | 11/2003 | Shibayama | 250/338.4 |
| 2003/0209668 A1 | * | 11/2003 | Tohyama | 250/338.1 |
| 2004/0089807 A1 | * | 5/2004 | Wada et al. | 250/338.1 |

FOREIGN PATENT DOCUMENTS

| | | |
|---|---|---|
| JP | H10-185681 A | 7/1998 |
| JP | 2987198 A | 10/1999 |
| JP | 2001-215151 A | 8/2001 |
| JP | 2002-340684 A | 11/2002 |
| JP | 2003-106895 A | 4/2003 |

* cited by examiner

Primary Examiner—David Porta
Assistant Examiner—Faye Boosalis
(74) Attorney, Agent, or Firm—Sughrue Mion Pllc.

(57) ABSTRACT

A thermal-type infra-red ray solid-state image sensor includes at least one device for detecting infra-red ray, wherein the device is comprised of a substrate including a signal-readout circuit, a contact electrode formed on the substrate and electrically connected to the signal-readout circuit, a diaphragm spaced away from and above the substrate, a support supporting the diaphragm such that the diaphragm floats above the substrate, and being composed of electrically conductive material to electrically connect the contact electrode to the diaphragm, and a hood formed on the diaphragm for preventing infra-red ray from being radiated to the support, absorbing the infra-red ray, and transferring heat resulted from the thus absorbed infra-red ray, to the diaphragm. The hood is comprised of a sidewall standing on the diaphragm, and an upper plate extending inwardly of the sidewall from an upper edge of the sidewall, the upper plate being formed with an opening.

23 Claims, 5 Drawing Sheets

THERMAL-TYPE INFRA-RED RAY SOLID-STATE IMAGE SENSOR AND METHOD OF FABRICATING THE SAME

CROSS-REFERENCE TO RELATED APPLICATION

The present application is a continuation-in-part (CIP) application based on the U.S. patent application Ser. No. 10/960,052 filed on Oct. 8, 2004 and claiming priority under 35 U.S.C. §119 from Japanese Patent Application No. 2003-350,430 which was filed on Oct. 9, 2003.

BACKGROUND OF THE INVENTION

1. Field of the Invention

The invention relates to a thermal-type infra-red ray solid-state image sensor, and a method of fabricating the same, and more particularly to a thermal-type infra-red ray solid-state image sensor including a hood for enhancing an aperture ratio of a pixel, and a method of fabricating the same.

2. Description of the Related Art

Japanese Patent Application Publication No. 2001-215151 has suggested a thermal-type infra-red ray solid-state image sensor which is capable of allowing a thermal-type infra-red ray detector to have higher sensitivity and enhancing an aperture ratio.

Figure 1:
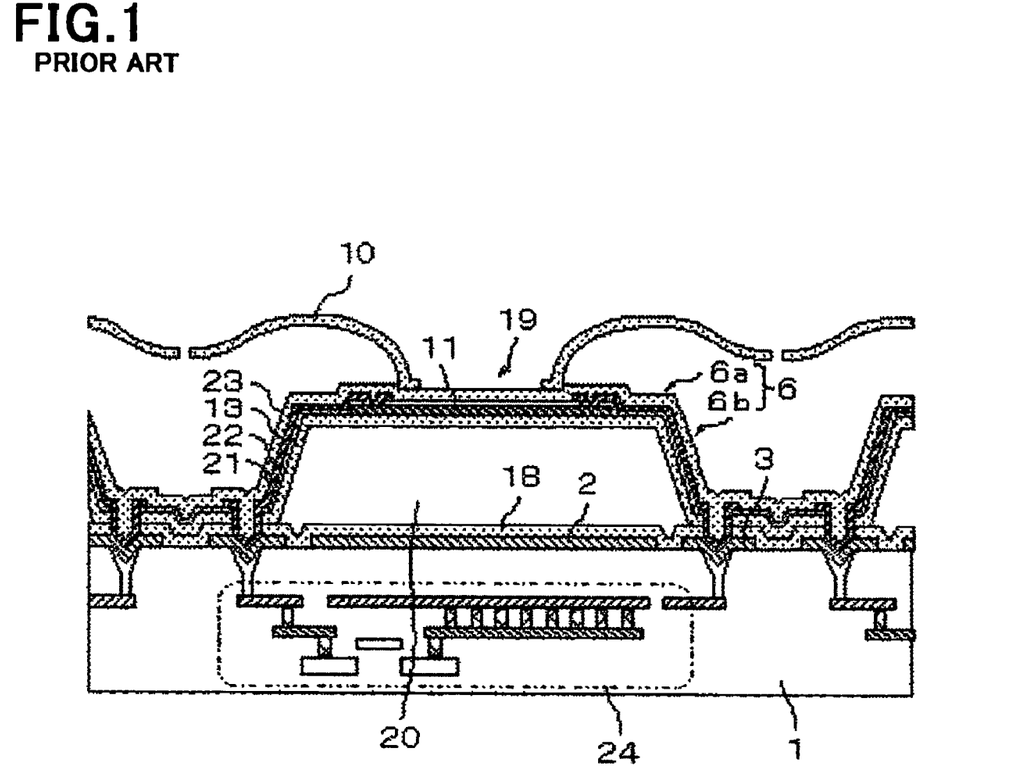
FIG. 1 is a cross-sectional view along a current path in a unit pixel in a conventional thermal-type infra-red ray solid-state image sensor.

FIG. 1 is a cross-sectional view along a current path in a unit pixel in a thermal-type infra-red ray solid-state image sensor suggested in the above-mentioned Publication.

The illustrated solid-state image sensor is comprised of a silicon integrated circuit substrate 1 in which a signal-readout circuit 24 is fabricated, a reflection film 2 composed of metal and formed on the substrate 1, a first electrically insulating protection film 18 formed on the substrate 1 to cover the reflection film 2 therewith, a infra-red ray receiver 19 formed above the first electrically insulating protection film 18, and a pair of supports 6 supporting the infra-red ray receiver 19 such that the infra-red ray receiver 19 floats above the first electrically insulating protection film 18 with a cavity 20 therebetween.

The infra-red ray receiver 19 is in the form of a diaphragm (accordingly, the infra-red ray receiver 19 is often called "a diaphragm"), and is arranged in each of pixels.

The infra-red ray receiver 19 is comprised of a bolometer thin film 11 acting as a temperature detector, two electrodes of a metal wire 13 making electrical contact with the bolometer thin film 11, and electrically insulating protection films 21, 22 and 23 surrounding the bolometer thin film 11 and the two electrodes.

The support 6 is comprised of the electrically insulating protection films 21, 22 and 23, and includes a beam 6a extending in parallel with a surface of the substrate 1, and a leg 6b connected to one of ends of the beam 6a. The electrically insulating protection films 21, 22 and 23 defining the support 6 surrounds the metal wire 13. Though the beam 6a may seem quite short in FIG. 1, the beam 6a actually extends along a side of the infra-red ray receiver 19 in order to reduce thermal conductance, and is connected at an end to the infra-red ray receiver 19. The metal wire 13 is electrically connected at one end (that is, an electrode) to the bolometer thin film 11, and at the other end (that is, the other electrode) to a contact electrode 3 of the signal-readout circuit 24.

A hood 10 extends from the infra-red ray receiver 19 so as to cover the electrodes of the infra-red ray receiver 19, the support 6 and the contact electrode 3 therewith with a space therebetween.

When infra-red ray is irradiated to the electrically insulating protection films 21, 22 and 23 and the hood 10, a part of the infra-red ray is absorbed into the electrically insulating protection films 21, 22 and 23 and the hood 10, and resultingly, the electrically insulating protection films 21, 22 and 23 and the hood 10 are heated. The rest of the infra-red ray passes through the infra-red ray receiver 19, the hood 10 and the support 6, and goes towards the substrate 1. Then, the infra-red ray having passed through the infra-red ray receiver 19, the hood 10 and the support 6 is reflected at the reflection film 2, the metal wire 13 and the contact electrode 3 towards the infra-red ray receiver 19 and the hood 10, and thus, enters the electrically insulating protection films 21, 22 and 23 and the hood 10 again. As a result, the electrically insulating protection films 21, 22 and 23 and the hood 10 are further heated.

Heat generated in the hood 10 is transferred to the bolometer thin film 11 through the electrically insulating protection films 21, 22 and 23. As a result of heat transfer to the bolometer thin film 11 from the electrically insulating protection films 21, 22 and 23 and the hood 10, a temperature of the bolometer thin film 11 varies, and hence, a resistance of the bolometer thin film 11 varies. The signal-readout circuit 24 of the substrate 1 converts the variance of a resistance of the bolometer thin film 11 into variance of a voltage. An external circuit reads out the thus converted voltage as an electric signal, and makes infra-red images based on the read-out voltage.

In the thermal-type infra-red ray solid-state image sensor illustrated in FIG. 1, since the hood 10 extending from the infra-red ray receiver 19 covers the electrodes of the infra-red ray receiver 19, the support 6 and the contact electrode 3 therewith with a space therebetween, it is possible for each of pixels to have a higher aperture ratio and absorb much infra-red ray, ensuring higher sensitivity.

In the thermal-type infra-red ray solid-state image sensor illustrated in FIG. 1, the infra-red ray receiver 19, the support 6 and the hood 10 are all comprised of a silicon nitride film, a silicon oxide film or a silicon oxynitride film. The infra-red ray receiver 19 and the support 6 are comprised of an electrically insulating protection film in a common layer. To the contrary, since the hood 10 is designed to extend to cover the electrodes of the infra-red ray receiver 19, the support 6 and the contact electrode 3 of the substrate 1 therewith with a space therebetween, the hood 10 is comprised of a film in a different layer from that of the infra-red ray receiver 19 and the support 6. This causes a problem that there is an unnecessary portion of the electrically insulating film of which the hood 10 is comprised (hereinbelow, such a portion is referred to simply as "unnecessary film portion"), existing directly on the infra-red ray receiver 19, and not contributing to enhancement of an aperture ratio. If the unnecessary film portion remains as it is without being removed, there would be caused unnecessary increase in a thermal mass in the infra-red ray receiver 19 with the result of deterioration in thermal response performance of the infra-red ray receiver 19.

In order to such deterioration in thermal response performance of the infra-red ray receiver 19, it is necessary to remove the unnecessary film portion by etching. Hence, the unnecessary film portion is removed in the thermal-type infra-red ray solid-state image sensor illustrated in FIG. 1 (the unnecessary film portion is not illustrated on the infra-red ray receiver 19 in FIG. 1). According to the above-mentioned Publication, in a step of patterning an electrically insulating film into a hood, the unnecessary film portion is etched for removal.

Since it is necessary in the step of patterning an electrically insulating film into a hood to surely separate the electrically insulating film into hoods in each of pixels, the electrically insulating film has to be over-etched such that the electrically insulating film is etched in a depth equal to or greater than a thickness of the electrically insulating film. Accordingly, the thermal-type infra-red ray solid-state image sensor suggested in the above-mentioned Publication is accompanied with a problem that an electrically insulating film of which the infra-red ray receiver 19 is comprised is much etched, and furthermore, it is difficult to control etching of the electrically insulating film, resulting in variance in characteristics among pixel, wafers and/or lots. Furthermore, if the electrically insulating film is too over-etched, the electrically insulating film of which the infra-red ray receiver 19 is comprised is broken with the result that the bolometer thin film is damaged.

In order to avoid such problems, it is necessary to enhance an accuracy with which a step of etching the electrically insulating film of which the hood 10 is comprised is carried out. As another solution, an etching stopper film may be formed at an area where the above-mentioned unnecessary film portion is to be deposited, before depositing the electrically insulating film of which the hood 10 is comprised. However, this solution is accompanied with another problem that additional steps have to be carried out for forming and patterning an etching stopper film, and a term for fabricating a thermal-type infra-red ray solid-state image sensor is unavoidably lengthened.

Japanese Patent Application Publication No. 2002-340684 has suggested a thermal-type infra-red ray solid-state image sensor including a detector, and a signal processor for processing signals transmitted from the detector, both of which are formed on a common silicon substrate. The detector has an electrically insulating film having a thickness smaller than a thickness of an interlayer layer of the signal processor.

Japanese Patent No. 2987198 based on PCT/GB90/01391 (WO91/05284) has suggested a method of fabricating a mechanical micro-switch, including the steps of forming a first sacrifice layer on a substrate, forming an island-shaped second sacrifice layer on the first sacrifice layer, forming a switching device layer on the second sacrifice layer, the switching device layer being composed of resilient material, defining an outline of a switching device on the switching device layer, defining an outline of a window, etching the second sacrifice layer through the window to horizontally undercut the switching device layer, and etching the first sacrifice layer through the etched second sacrifice layer to form a space below the switching device layer.

Japanese Patent Application Publication No. 10-185681 has suggested an thermal-type infra-red ray sensor including an infra-red ray receiver comprised of an absorption layer receiving infra-red ray and converting the received infra-red ray into thermal energy, and a sensor having material values varying in accordance with a magnitude of the thermal energy. The infra-red ray receiver is supported above a semiconductor substrate with a space therebetween by means of a support comprised of a cross-linking portion, a first pillar, and a second pillar. The cross-linking portion, the first pillar, and the second pillar are formed below the infra-red ray receiver, and are partially or entirely covered with the infra-red ray receiver.

Japanese Patent Application Publication No. 2003-106895 has suggested a method of fabricating a thermal-type infra-red ray detector including a pixel in which a diaphragm having a bolometer layer is kept floating by means of a beam fixed at one end thereof to a substrate. The method includes the steps of forming a second sacrifice layer on the diaphragm before removal of a first sacrifice layer, forming a window layer on the second sacrifice layer, infra-red ray being able to pass through the window layer, simultaneously removing the first and second sacrifice layers through a through-hole formed throughout the window layer, and forming a vacuum-sealing layer on the window layer to clog the through-hole after evacuating a cavity resulted from removal of the first and second sacrifice layers.

SUMMARY OF THE INVENTION

In view of the above-mentioned problems in the conventional thermal-type infra-red ray solid-state image sensor, it is an object of the present invention to provide a thermal-type infra-red ray solid-state image sensor which is capable of preventing variance in characteristics among pixels, wafers and/or lots, and removing the above-mentioned unnecessary film portion without increase in fabrication steps and fabrication term, to prevent deterioration in thermal response characteristics.

It is also an object of the present invention to provide a method of fabricating such a thermal-type infra-red ray solid-state image sensor.

Hereinbelow are described a thermal-type infra-red ray solid-state image sensor and a method of fabricating the same in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a thermal-type infra-red ray solid-state image sensor including at least one device for detecting infra-red ray, the device including a substrate (1) including a signal-readout circuit (24), a contact electrode (3) formed on the substrate (1) and electrically connected to the signal-readout circuit (24), a diaphragm (5) spaced away from and above the substrate (1), the diaphragm (5) including an infra-red ray absorber absorbing infra-red ray to be heated, a temperature detector detecting a temperature of the infra-red ray absorber, and an electrode electrically connected to the temperature detector, a support (6) supporting the diaphragm (5) such that the diaphragm (5) floats above the substrate (1), and being at least partially composed of electrically conductive material to electrically connect the contact electrode (3) to the electrode, and a hood (10) formed on the diaphragm (5) for preventing infra-red ray from being radiated to the support (6), absorbing the infra-red ray, and transferring heat resulted from the thus absorbed infra-red ray, to the diaphragm (5), the hood (10) being comprised of a sidewall (100, 101, 101A) standing on the diaphragm (5), and an upper plate (102) extending outwardly of the sidewall (100) from an upper edge of the sidewall (100).

It is preferable that the sidewall is comprised of a first sidewall (100) and a second sidewall (101, 101A) which extend in a V-shaped fashion, the upper plate (102) extending outwardly of the first sidewall (100).

The thermal-type infra-red ray solid-state image sensor may further include a second upper plate (103) extending inwardly of the second sidewall (101) from an upper edge of the second sidewall (101), the second upper plate (103) being formed with an opening (17) through which the diaphragm (5) is exposed.

It is preferable that the second upper plate (103) is formed centrally with the opening (17).

There is further provided a thermal-type infra-red ray solid-state image sensor including at least one device for detecting infra-red ray, the device including a substrate (1) including a signal-readout circuit (24), a contact electrode (3) formed on the substrate (1) and electrically connected to the signal-readout circuit (24), a diaphragm (5) spaced away from and above the substrate (1), the diaphragm (5) including an infra-red ray absorber absorbing infra-red ray to be heated, a temperature detector detecting a temperature of the infra-red ray absorber, and an electrode electrically connected to the temperature detector, a support (6) supporting the diaphragm (5) such that the diaphragm (5) floats above the substrate (1), and being at least partially composed of electrically conductive material to electrically connect the contact electrode (3) to the electrode, and a hood (10) formed on the diaphragm (5) for preventing infra-red ray from being radiated to the support (6), absorbing the infra-red ray, and transferring heat resulted from the thus absorbed infra-red ray, to the diaphragm (5), the hood (10) being comprised of, when vertically viewed, a first portion (10A) standing on the diaphragm (5) and extending upwardly and outwardly of the diaphragm (5) to cover the support (6) with a space therebetween, and a second portion (10B) standing on the diaphragm (5) and extending upwardly of the diaphragm (5).

It is preferable that the second portion (10B) extends inwardly of the diaphragm to overlap the diaphragm (5).

It is preferable that the first and second portions (10A, 10B) stand on the diaphragm (5) at a common location.

It is preferable that the first portion (10A) is comprised of a first sidewall (100) standing on the diaphragm (5) and extending upwardly and a first upper plate (102) extending outwardly of the diaphragm (5) from an upper edge of the first sidewall (100), and the second portion (10B) is comprised of a second sidewall (101, 101A) standing on the diaphragm (5) and extending upwardly of the diaphragm (5), the first and second sidewalls (100, 101, 101A) being V-shaped.

The thermal-type infra-red ray solid-state image sensor may further include a second upper plate (103) extending inwardly of the diaphragm (5) from an upper edge of the second sidewall (101).

In another aspect of the present invention, there is provided a method of fabricating a thermal type infra-red ray solid-state image sensor, including the steps of (a) forming a first sacrifice layer (4) on a substrate (1) except on a contact electrode (3) formed on the substrate (1) and electrically connected to a signal-readout circuit (24) included in the substrate (1), (b) forming a diaphragm (5) and a support (6) on the first sacrifice layer (4), the support (6) supporting the diaphragm (5) such that the diaphragm (5) floats above the substrate (1), and being at least partially composed of electrically conductive material to electrically connect the contact electrode (3) to the diaphragm (5), (c) forming a second sacrifice layer (7) outside the diaphragm (5) and on the diaphragm (5) in an island shape, (d) depositing a material of which a hood (10) is composed, on both the second sacrifice layer (7) and the diaphragm (5), (e) patterning the material to remove a part of the second sacrifice layer (7) formed outside the diaphragm (5) and a part of the second sacrifice layer (7) formed on the diaphragm (5), to form the hood (10), and (f) removing the first and second sacrifice layers (4, 7) through openings of the material resulted from the step (e).

For instance, the hood (10) may be formed in the step (e) to be comprised of a sidewall (100, 101) standing on the diaphragm (5), and an upper plate extending inwardly of the sidewall from an upper edge of the sidewall (100, 101), the upper plate being formed with an opening (17) through which the diaphragm (5) is exposed.

For instance, the hood (10) may be formed in the step (e) to be being comprised of, when vertically viewed, a first portion (10A) standing on the diaphragm (5) and extending upwardly and outwardly of the diaphragm (5) to cover the support (6) with a space therebetween, and a second portion (10B, 101A) standing on the diaphragm (5) and extending upwardly of the diaphragm (5).

It is preferable that the second portion (10B) extends inwardly of the diaphragm.

It is preferable that the first and second portions (10A, 10B, 101A) stand on the diaphragm (5) at a common location, in which case, the first and second portions (10A, 10B, 101A) are preferably V-shaped.

It is preferable that the first sacrifice layer (4) and/or the second sacrifice layer (7) are (is) composed of polyimide.

It is preferable that the first sacrifice layer (4) and/or the second sacrifice layer (7) are (is) composed of polysilicon.

It is preferable that the first sacrifice layer (4) and/or the second sacrifice layer (7) are (is) composed of aluminum.

It is preferable that the diaphragm (5) and the support (6) are composed of silicon oxide, and the first and second sacrifice layers (4, 7) are composed of silicon nitride. As an alternative, the diaphragm (5) and the support (6) may be composed of silicon nitride, and the first and second sacrifice layers (4, 7) may be composed of silicon oxide.

In accordance with the above-mentioned present invention, the second sacrifice layer is formed in an island-shape centrally on the diaphragm where an unnecessary film portion of an electrically insulating film of which the hood is comprised will exist. Hence, the island-shaped second sacrifice layer separates the diaphragm from the unnecessary film portion. Since the second sacrifice layer is originally formed in a process of fabricating a solid-state image sensor, for making a space between a hood and parts other than a diaphragm, it is not necessary to carry out any additional step for forming the island-shaped second sacrifice layer.

In addition, since the unnecessary film portion is removed simultaneously when an electrically insulating protection film is patterned into the hood, it is not necessary to carry out any additional step for removing the unnecessary film portion. Furthermore, since the island-shaped second sacrifice layer is removed in a step of etching the first and second sacrifice layers for removal, the method of fabricating a thermal-type infra-red ray solid-state image sensor in accordance with the present invention does not need to carry out any additional steps, and does not lengthen a fabrication term.

In addition, since a multi-layered structure formed below the unnecessary film portion is the same as a multi-layered structure formed below the hood, they have the same etching margin as each other, and the unnecessary film portion is completely etched in the island-shaped second sacrifice layer, ensuring that an electrically insulating film of which the hood is comprised is etched with the same high accuracy as accuracy obtained when an etching stopper film is formed on a diaphragm. Since the unnecessary film portion is removed, it would be possible to prevent reduction of thermal response characteristics. Thus, the above-mentioned problems can be solved.

The advantages obtained by the aforementioned present invention will be described hereinbelow.

In accordance with the present invention, the island-shaped second sacrifice layer originally formed in a process of fabricating a solid-state image sensor is used to separate the diaphragm from the unnecessary film portion. The unnecessary film portion is removed simultaneously when an electrically insulating film is patterned into the hood. Since the second sacrifice layer separating the diaphragm from the unnecessary film portion is removed at a step of etching the first and second sacrifice layers for removal, the unnecessary film portion can be removed without necessity of carrying out any additional steps and further without increase in a fabrication term.

Furthermore, since the unnecessary film portion is completely etched in the island-shaped second sacrifice layer, it is ensured that an electrically insulating film of which the hood is comprised is etched with the same high accuracy as accuracy obtained when an etching stopper film is formed on a diaphragm. Since the unnecessary film portion is removed, it would be possible to prevent reduction of thermal response characteristics.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 2A:
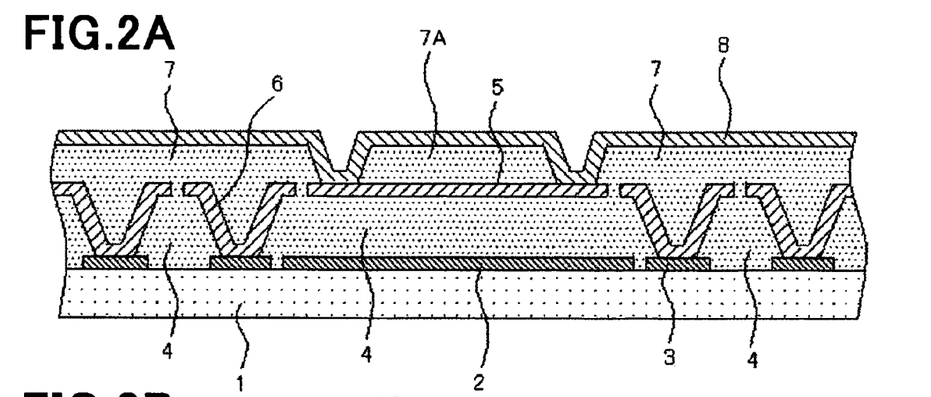
FIGS. 2A to 2C are cross-sectional views of a thermal-type infra-red ray solid-state image sensor in accordance with the first embodiment of the present invention, illustrating respective steps to be carried out in a method of fabricating the same.
Figure 2B:
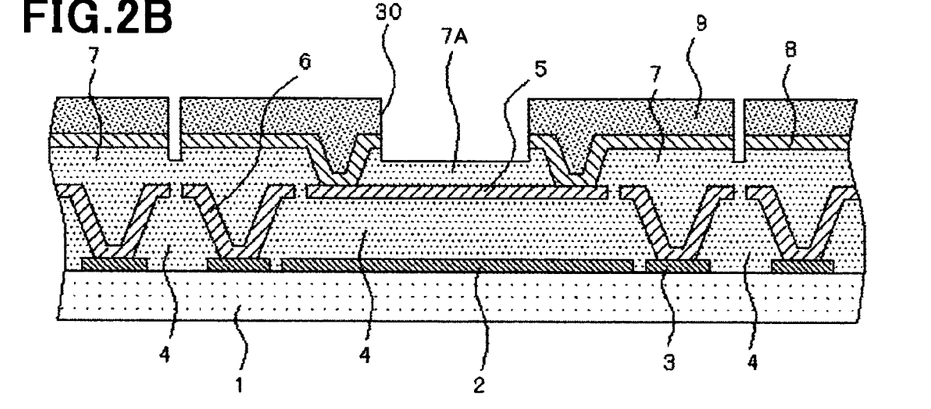
Figure 2C:
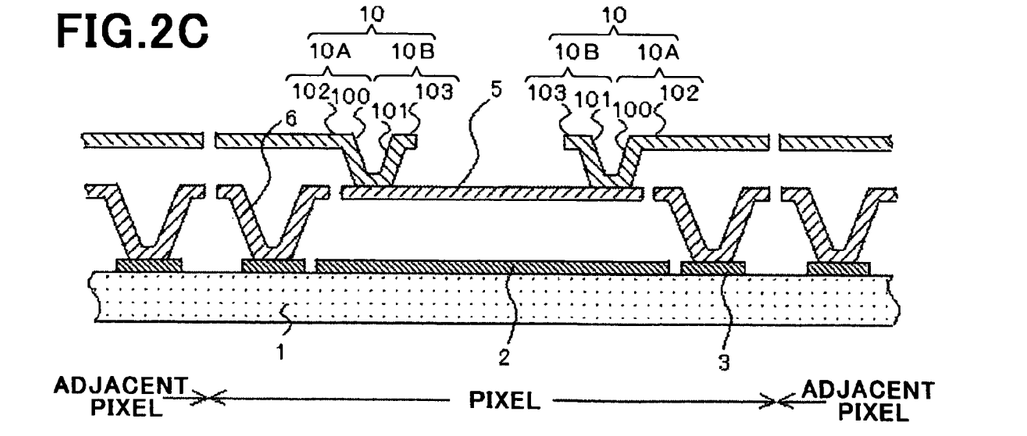
Figure 3A:
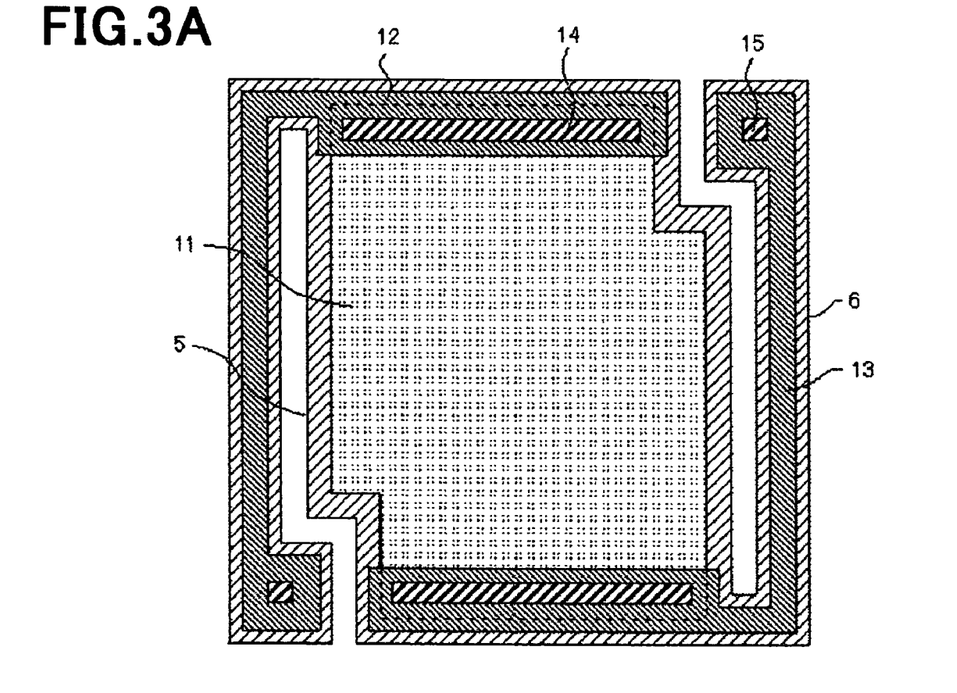
FIG. 3A is a plan view of a unit pixel in a thermal-type infra-red ray solid-state image sensor in accordance with the first embodiment of the present invention, with a hood being removed.
Figure 3B:
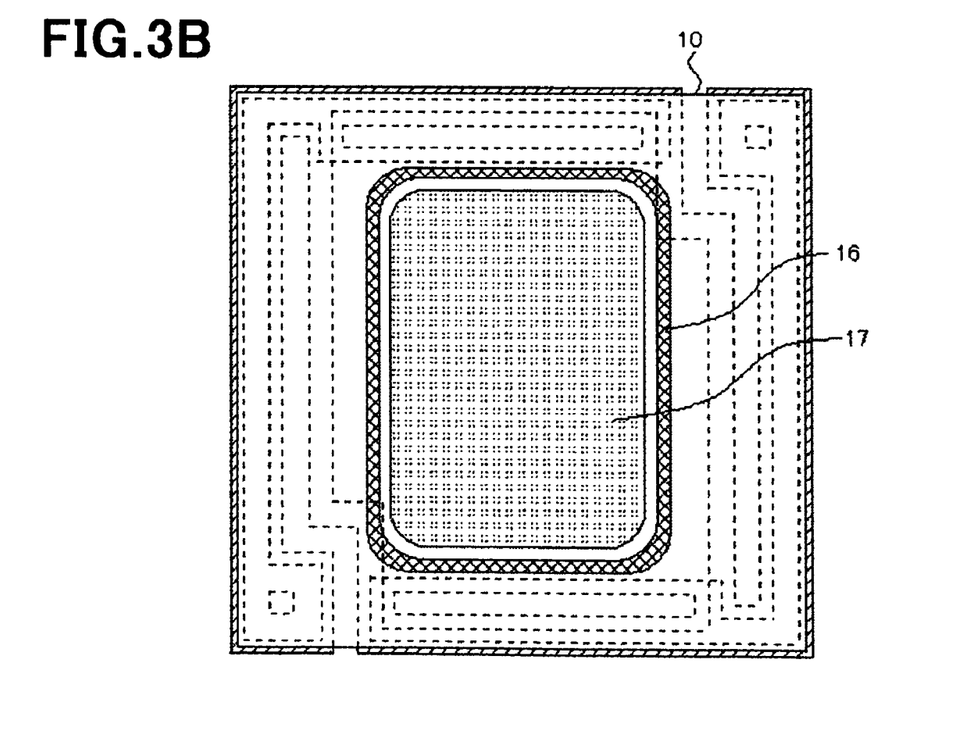
FIG. 3B is a plan view of a unit pixel in a thermal-type infra-red ray solid-state image sensor in accordance with the first embodiment of the present invention, with a hood.

FIGS. 2A to 2C are cross-sectional views of a thermal-type infra-red ray solid-state image sensor in accordance with the first embodiment of the present invention, illustrating respective steps to be carried out in a method of fabricating the same, FIG. 3A is a plan view of the thermal-type infra-red ray solid-state image sensor with a hood being removed, and FIG. 3B is a plan view of the thermal-type infra-red ray solid-state image sensor with a hood.

Hereinbelow is explained a method of fabricating a thermal-type infra-red ray solid-state image sensor in accordance with the first embodiment, with reference to FIGS. 2A to 2C, 3A and 3B.

First, a silicon integrated circuit substrate 1 is fabricated in accordance with a conventional process. The silicon integrated circuit substrate 1 includes a signal-readout circuit (not illustrated in FIGS. 2A to 2C) such as the signal-readout circuit 24 illustrated in FIG. 1. On the substrate 1 are formed a reflection film 2 composed of metal, and a plurality of contact electrodes 3. Though not illustrated in FIGS. 2A to 2C, an electrically insulating protection film may be formed to cover the substrate 1, the reflection film 2 and the contact electrodes 3 therewith.

Then, as illustrated in FIG. 2A, a first sacrifice layer 4 is formed on the substrate 1 except an area in which the contact electrodes 3 make contact with a later-mentioned support 6 for making a space between the substrate 1 and a later-mentioned diaphragm 5 and further between the substrate 1 and a later-mentioned support 6. For instance, the first sacrifice layer 4 is formed by coating photosensitive polyimide onto the substrate 1, patterning the photosensitive polyimide by photolithography, and thermally annealing the photosensitive polyimide. The first sacrifice layer 4 has a thickness in the range of about 0.5 to about 3.0 micrometers both inclusive.

Then, a diaphragm 5 and a support 6 are formed on the first sacrifice layer 4 and the contact electrodes 3 in such a way as mentioned below.

First, an electrically insulating lower protection film is formed on the first sacrifice layer 4 and the contact electrodes 3 by plasma-enhanced chemical vapor deposition (PCVD), for instance. The electrically insulating lower protection film has a thickness in the range of about 100 to about 500 nanometers both inclusive, and is comprised of a silicon oxide/dioxide film (SiO, $SiO_2$), a silicon nitride film (SiN, $Si_3N_4$) or a silicon oxynitride film (SiON).

Then, a material of which a bolometer thin film 11 (see FIG. 3A) is composed is deposited on the electrically insulating lower protection film by sputtering. Then, the material is patterned into the bolometer thin film 11 so as to match the diaphragm 5 in a pixel illustrated in FIG. 3A. The bolometer thin film 11 has a thickness in the range of about 50 to about 200 nanometers both inclusive, and is composed of vanadium oxide ($V_2O_3$, VOx etc.) or titanium oxide (TiOx), for instance.

Then, an electrically insulating protection film is formed by PCVD to cover the bolometer thin film 11 therewith. The thus formed electrically insulating protection film is then formed with a bolometer contact 14 and a contact electrode contact 15, as illustrated in FIG. 3A. For instance, the electrically insulating protection film has a thickness in the range of about 50 to about 200 nanometers both inclusive, and is comprised of a silicon oxide/dioxide film (SiO, $SiO_2$), a silicon nitride film (SiN, $Si_3N_4$) or a silicon oxynitride film (SiON).

Then, a thin metal film of which a metal wire 13 is comprised is formed by sputtering. Then, the thin metal film is patterned into the metal wire 13 so as to match with the support 6. The metal wire 13 has a thickness in the range of about 50 to about 200 nanometers both inclusive, and is composed of aluminum, copper, gold, titanium, tungsten, molybdenum or alloy composed of titanium, aluminum and vanadium.

Then, an electrically insulating upper protection film is formed by PCVD to cover the electrically insulating protection film and the metal wire 13 therewith. For instance, the electrically insulating upper protection film has a thickness in the range of about 100 to about 500 nanometers both inclusive, and is comprised of a silicon oxide/dioxide film (SiO, $SiO_2$), a silicon nitride film (SiN, $Si_3N_4$) or a silicon oxynitride film (SiON).

Then, the films from the electrically insulating upper protection film to the electrically insulating lower protection film are simultaneously patterned into the diaphragm 5 and the support 6. By patterning the films into the diaphragm 5 and the support 6, the first sacrifice layer 4 composed of polyimide is partially exposed.

Then, a second sacrifice layer 7 for making a space between an electrode 12 and the hood 10 and further between the support 6 and the hood 10 is formed on the electrode 12 and the support 6. Furthermore, an island-shaped second sacrifice layer 7A as a part of the second sacrifice layer 7 is formed centrally on the diaphragm 5 in order to make it possible to remove an unnecessary film portion of an electrically insulating film 8 of which the hood 10 is comprised, without any damage to the diaphragm 5. The second sacrifice layer 7 and the island-shaped second sacrifice layer 7A are simultaneously formed. For instance, the second sacrifice layer 7 including the island-shaped second sacrifice layer 7A is formed by coating photosensitive polyimide onto the electrode 12 and the support 6, patterning the photosensitive polyimide by photolithography, and thermally annealing the photosensitive polyimide. The second sacrifice layer 7 has a thickness in the range of about 0.5 to about 3.0 micrometers both inclusive.

Then, on the second sacrifice layer 7 and the exposed area of the diaphragm 5 is formed an electrically insulating film 8 of which the hood 10 is comprised, by PCVD, for instance. The electrically insulating film 8 has a thickness in the range of about 300 to about 2000 nanometers both inclusive, and is comprised of a silicon oxide/dioxide film (SiO, $SiO_2$), a silicon nitride film (SiN, $Si_3N_4$) or a silicon oxynitride film (SiON).

If the electrically insulating film 8 is formed thick, it is preferable that the second sacrifice layer 7 is also formed thick, because process margin can be ensured. It is not always necessary for the film of which the hood 10 is comprised, to be comprised of an electrically insulating film. The film of which the hood 10 is comprised may be composed of any material, if it has a function of absorbing infra-red ray.

Then, as illustrated in FIG. 2B, a photoresist mask 9 is formed on the electrically insulating film 8. Then, the electrically insulating film 8 is patterned into the hood 10 by photolithography and etching through the use of the photoresist mask 9. At the same time, an unnecessary film portion of the electrically insulating film 8 existing on the island-shaped second sacrifice layer 7A is removed by etching.

As a result, as illustrated in FIG. 2B, the hood 10 makes close contact with the diaphragm 5 through a ring-shaped connector 16 (see FIG. 3B), and the hood 10 is formed slightly inwardly of the ring-shaped connector 16 with an opening 17. Since a multi-layered structure formed below the unnecessary film portion is the same as a multi-layered structure formed below the hood 10, they have the same etching margin as each other, and etching of the unnecessary film portion certainly stops in the island-shaped second sacrifice layer 7A, resulting in that the island-shaped second sacrifice layer 7A remains in the opening 17.

Then, as illustrated in FIG. 2C, the first sacrifice layer 4 and the second sacrifice layer 7 are removed by ashing through the use of oxygen gas plasma. Thus, there are formed spaces between the hood 10 and the substrate 1 and between the diaphragm 5 and the substrate 1. By the ashing, the island-shaped second sacrifice layer 7A remaining in the opening 17 is also removed.

As illustrated in FIG. 2C, when vertically viewed, the hood 10 is comprised of a first portion 10A and a second portion 10B.

The first portion 10A is comprised of a first sidewall 100 standing on the diaphragm 5 and extending upwardly and outwardly of the diaphragm 5, and a first upper plate 102 extending outwardly from an upper edge of the first sidewall 100 and overlapping the support 6 with a space therebetween. The second portion 10B is comprised of a second sidewall 101 standing on the diaphragm 5 and extending upwardly and inwardly of the diaphragm 5, and a second upper plate 103 extending inwardly from an upper edge of the second sidewall 101 and partially overlapping the diaphragm 5.

The first sidewall 100 of the first portion 10A and the second sidewall 101 of the second portion 10B stand on the diaphragm 5 at a common location, and are V-shaped.

By carrying out the above-mentioned steps, there is fabricated the thermal-type infra-red ray solid-state image sensor in accordance with the first embodiment, including a plurality of thermal-type infra-red ray detectors in each of which the diaphragm 5 including the hood 10 from which the unnecessary film portion is removed is supported by the support 6 to float above the substrate 1.

In accordance with the first embodiment, the thermal-type infra-red ray solid-state image sensor is fabricated without and additional steps in comparison with a conventional process for fabricating a thermal-type infra-red ray solid-state image sensor, and the unnecessary film portion can be removed with high accuracy.

In the above-mentioned first embodiment, the first and second sacrifice layers 4 and 7 may be composed of polysilicon or aluminum.

When the first and second sacrifice layers 4 and 7 are composed of polysilicon, the first and second sacrifice layers 4 and 7 may be removed by wet-etching through the use of hydrazine or tetramethylanmmoniumhydrooxide (TMAH), or dry-etching through the use of $XeF_2$ plasma, for instance.

When the first and second sacrifice layers 4 and 7 are composed of aluminum, the first and second sacrifice layers 4 and 7 may be removed by wet-etching through the use of hydrochloric acid or hot phosphoric acid. When the diaphragm 5 or the support 6 is comprised of a silicon nitride film, if phosphoric acid is heated too much, specifically, if phosphoric acid is heated up to about 160 degrees centigrade, the silicon nitride film would be also etched. Hence, it is preferable that phosphoric acid is heated at a temperature in the range of about 100 to about 140 degrees centigrade.

When the diaphragm 5 and the support 6 are comprised of a silicon oxide film, the first and second sacrifice layers 4 and 7 may be comprised of a silicon nitride film. To the contrary, when the diaphragm 5 and the support 6 are comprised of a silicon nitride film, the first and second sacrifice layers 4 and 7 may be comprised of a silicon oxide film. When the first and second sacrifice layers 4 and 7 are comprised of a silicon nitride film, they may be removed by wet-etching through the use of hot phosphoric acid. When the first and second sacrifice layers 4 and 7 are comprised of a silicon oxide film, they may be removed by wet-etching through the use of hydrofluoric acid.

The solid-state image sensor in accordance with the above-mentioned embodiment is designed to include a bolometer thin film as a temperature detector. It should be noted that the solid-state image sensor may include another temperature detector such as a thermo-pile.

Second Embodiment

Figure 4A:
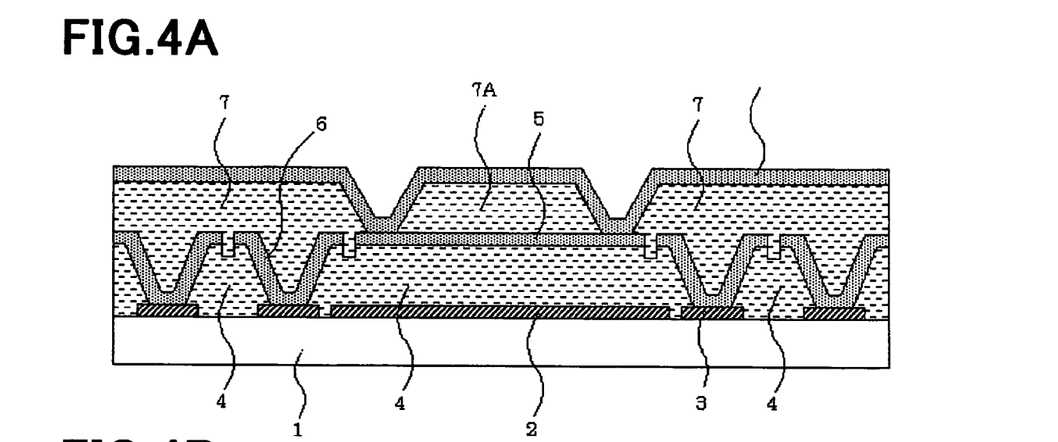
FIGS. 4A to 4C are cross-sectional views of a thermal-type infra-red ray solid-state image sensor in accordance with the second embodiment of the present invention, illustrating respective steps to be carried out in a method of fabricating the same.
Figure 4B:
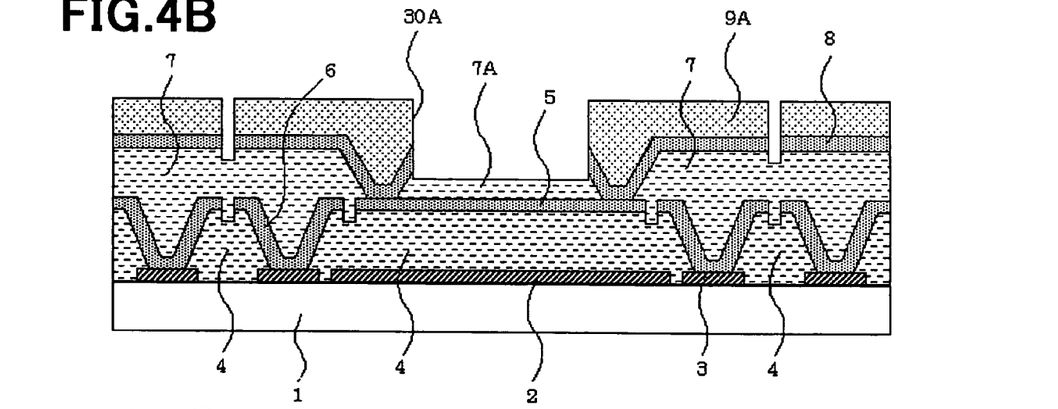
Figure 4C:
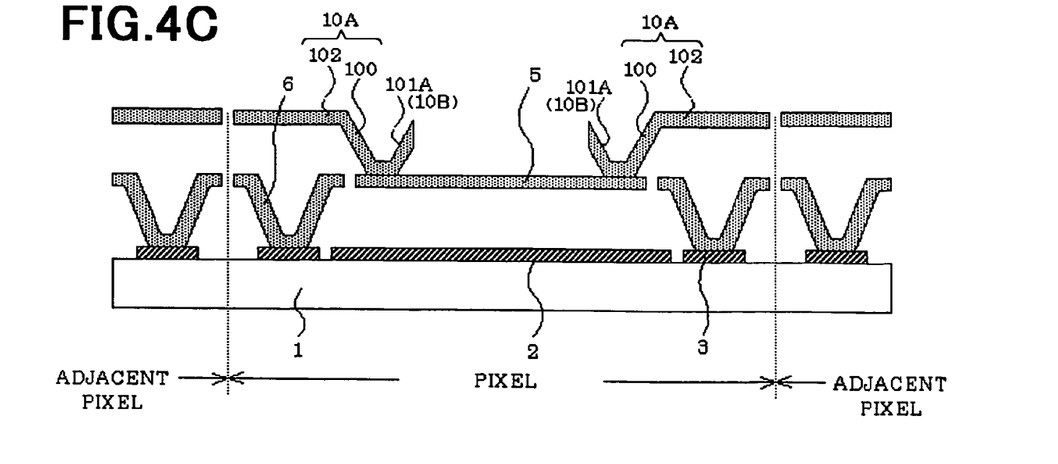
Figure 5A:
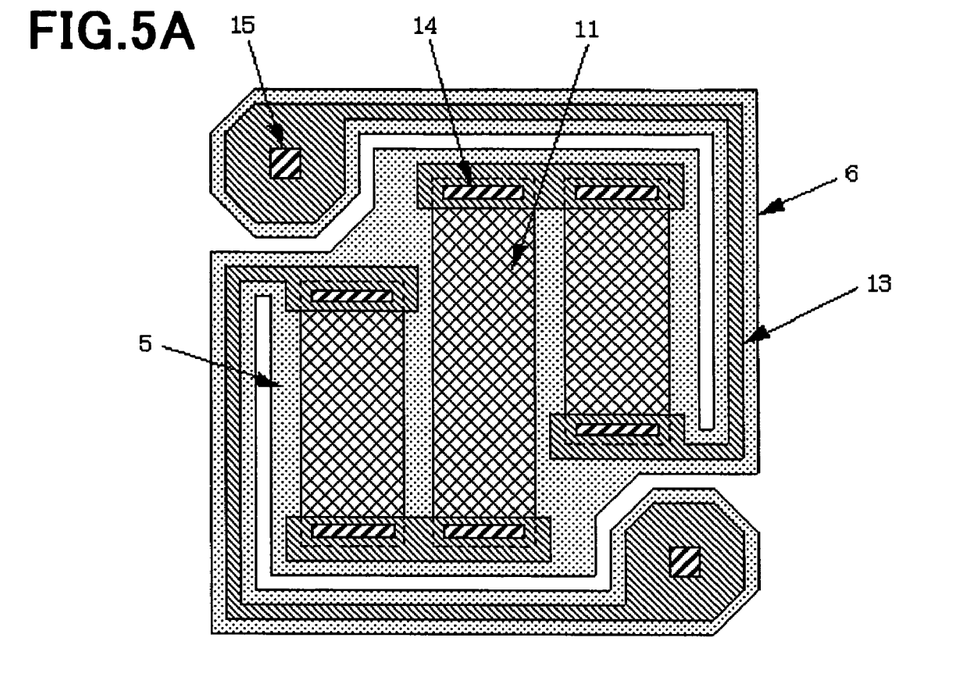
FIG. 5A is a plan view of a unit pixel in a thermal-type infra-red ray solid-state image sensor in accordance with the second embodiment of the present invention, with a hood being removed.
Figure 5B:
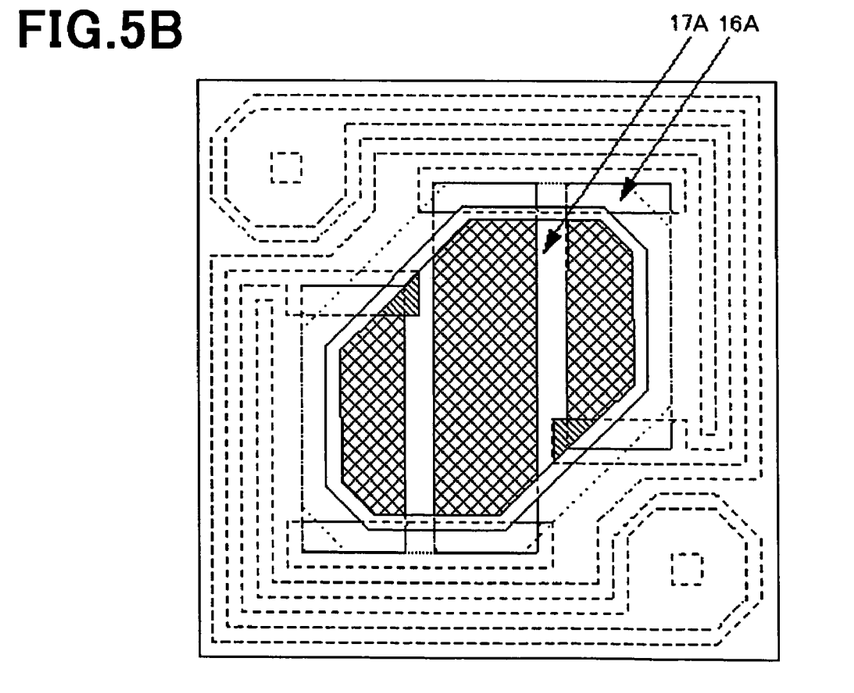
FIG. 5B is a plan view of a unit pixel in a thermal-type infra-red ray solid-state image sensor in accordance with the second embodiment of the present invention, with a hood.

FIGS. 4A to 4C are cross-sectional views of a thermal-type infra-red ray solid-state image sensor in accordance with the second embodiment of the present invention, illustrating respective steps to be carried out in a method of fabricating the same, FIG. 5A is a plan view of the thermal-type infra-red ray solid-state image sensor with a hood being removed, and FIG. 5B is a plan view of the thermal-type infra-red ray solid-state image sensor with a hood.

Hereinbelow is explained a method of fabricating a thermal-type infra-red ray solid-state image sensor in accordance with the second embodiment, with reference to FIGS. 4A to 4C, 5A and 5B.

First, similarly to the above-mentioned method for fabricating the thermal-type infra-red ray solid-state image sensor in accordance with the first embodiment, there is fabricated the structure illustrated in FIG. 4A which is identical with the structure illustrated in FIG. 2A.

Then, as illustrated in FIG. 4B, a photoresist mask 9A is formed on the electrically insulating film 8. Whereas the opening 30 of the mask 9 in the first embodiment intersects with a portion of the electrically insulating film 8 which will make the upper plate 103 of the hood 10, an opening 30A of the photoresist mask 9A intersects with the second sidewall 101 of the hood 10. Then, the electrically insulating film 8 is patterned into the hood 10 by photolithography and etching through the use of the photoresist mask 9A. At the same time, an unnecessary film portion of the electrically insulating film 8 existing on the island-shaped second sacrifice layer 7A is removed by etching.

As a result, as illustrated in FIG. 4B, the hood 10 makes close contact with the diaphragm 5 through a connecting region 16A (see FIG. 5B), and the hood 10 is formed slightly inwardly of the connecting region 16A with an opening 17A. By forming the opening 30A such that the edge of the opening 30A is located above the island-shaped second sacrifice layer 7A where the island-shaped second sacrifice layer 7A has such a thickness as not being etched out even by an etching carried out for forming the hood 10, the island-shaped second sacrifice layer 7A remains entirely in the opening 17A after the above-mentioned etching.

Then, as illustrated in FIG. 4C, the first sacrifice layer 4 and the second sacrifice layer 7 are removed by ashing through the use of oxygen gas plasma. Thus, there are formed spaces between the hood 10 and the substrate 1 and between the diaphragm 5 and the substrate 1. By the ashing, the second sacrifice layer 7 remaining in the opening 17A is also removed.

As illustrated in FIG. 4C, when vertically viewed, the hood 10 is comprised of a first portion 10A and a second portion 10B.

The first portion 10A is comprised of a first sidewall 100 standing on the diaphragm 5 and extending upwardly and outwardly of the diaphragm 5, and a first upper plate 102 extending outwardly from an upper edge of the first sidewall 100 and overlapping the support 6 with a space therebetween. The second portion 10B is comprised of a second sidewall 101A standing on the diaphragm 5 and extending upwardly and inwardly of the diaphragm 5. Unlike the second portion 10B in the first embodiment, the second portion 10B in the second embodiment does not include an upper plate extending inwardly from an upper edge of the second sidewall 101A.

The first sidewall 100 of the first portion 10A and the second sidewall 101A (the second portion 10B) branch from a common location on the diaphragm 5, and are almost V-shaped.

By carrying out the above-mentioned steps, there is fabricated the thermal-type infra-red ray solid-state image sensor in accordance with the second embodiment, including a plurality of thermal-type infra-red ray detectors in each of which the diaphragm 5 including the hood 10 from which the unnecessary film portion is removed is supported by the support 6 to float above the substrate 1.

In accordance with the second embodiment, similarly to the first embodiment, the thermal-type infra-red ray solid-state image sensor is fabricated without and additional steps in comparison with a conventional process for fabricating a thermal-type infra-red ray solid-state image sensor, and the unnecessary film portion can be removed with high accuracy.

The second embodiment is structurally different from the first embodiment in that the second sidewall 101 of the second portion 10B in the first embodiment is cut out halfway thereof. The halfway cut-out sidewall 101 defines the second portion 10B in the second embodiment.

In addition, as illustrated in FIG. 5B, each beam of the support 6 extends along two contiguous sides of the diaphragm 5.

EXAMPLE

The inventors conducted the experiment in order to confirm the advantages obtained by the present invention. Specifically, the inventors fabricated a bolometer type infra-red ray solid-state image sensor having 320×240 pixels wherein a pitch between adjacent pixels is 37 micrometers, in accordance with the method having been explained in the above-mentioned embodiment. Whereas the diaphragms 5 supporting with a pair of the supports 6 are arranged on the substrate 1 in an array in the above-mentioned embodiment, the beam 6a in the support 6 in the experiment did not extend along one side of a pixel, but extend along two sides of a pixel, similarly to the above-mentioned second embodiment. As a result, a ratio X/Y was about 65% wherein Y indicates an area of a pixel, and X indicates an area of a diaphragm not covered with a hood.

Both of the electrically insulating lower and upper protection films constituting the diaphragm 5 and the support 6 were comprised of a silicon nitride film having a thickness of 300 nanometers. The bolometer thin film was comprised of a vanadium oxide film having a thickness of 100 nanometers. The electrically insulating protection film formed on the bolometer thin film was comprised of a silicon nitride film having a thickness of 50 nanometers. The metal wiring 13 was comprised of a titanium/aluminum/vanadium alloy film having a thickness of 100 nanometers and a low thermal conductivity in order to prevent escape of heat generated by infra-red ray. The hood 10 was comprised of a silicon nitride film having a thickness of 1 micrometer. The second sacrifice layer 7 was designed to have a thickness of 1 micrometer such that the second sacrifice layer 7 could have a sufficient thickness even if the electrically insulating film 8 was patterned into the hood 10 by over-etching by about 50%. An aperture ratio of a pixel including the hood 10 was about 95%. A ratio of L/M was about 47% wherein M indicates an area of a pixel and L indicates the unnecessary film portion of the electrically insulating film 8 which was removed from a central area of the diaphragm 5.

The inventors also fabricated a bolometer type infra-red ray solid-state image sensor (reference example 1) having the same structure as that of the above-mentioned bolometer type infra-red ray solid-state image sensor except not including the hood 10, and a bolometer type infra-red ray solid-state image sensor (reference example 2) having the same structure as that of the above-mentioned bolometer type infra-red ray solid-state image sensor, but further having the unnecessary film portion of the electrically insulating film 8. The reference examples 1 and 2 were compared with the above-mentioned bolometer type infra-red ray solid-state image sensor in accordance with the present invention.

It was found out that the bolometer type infra-red ray solid-state image sensor in accordance with the present invention had an aperture ratio about 1.5 times greater than an aperture ratio of the reference example 1, and hence, had sensitivity about 1.5 times higher than sensitivity of the reference example 1.

The reference example 1 had a thermal time constant of 14.0 msec. The reference example 2 had a thermal time constant of 35.4 msec greater than doubled thermal time constant of the reference example 1, and further, greater than 33 msec corresponding to a frame rate of a television set. In contrast, the bolometer type infra-red ray solid-state image sensor in accordance with the present invention had a thermal time constant of 24.4 msec smaller than 33 msec corresponding to a frame rate of a television set.

Comparing the bolometer type infra-red ray solid-state image sensor in accordance with the present invention with the reference example 1 with respect to in-plane uniformity, there could not be found a significant difference therebetween. This means that the method of fabricating the bolometer type infra-red ray solid-state image sensor in accordance with the present invention keeps high accuracy with which the bolometer type infra-red ray solid-state image sensor is fabricated.

For instance, the present invention is applied to a thermal type infra-red ray solid-state image sensor used in a night vision device (an infra-red ray camera) or a thermography.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2003-350430 filed on Oct. 9, 2003 including specification, claims, drawings and summary is incorporated herein by reference in its entirety.

What is claimed is:

1. A thermal-type infra-red ray solid-state image sensor including at least one device for detecting infra-red ray, said device comprising:
a substrate including a signal-readout circuit;
a contact electrode formed on said substrate and electrically connected to said signal-readout circuit;
a diaphragm spaced away from and above said substrate, said diaphragm including an infra-red ray absorber absorbing infra-red ray to be heated, a temperature detector detecting a temperature of said infra-red ray absorber, and an electrode electrically connected to said temperature detector;
a support supporting said diaphragm such that said diaphragm is spaced above said substrate, and being at least partially composed of electrically conductive material to electrically connect said contact electrode to said electrode; and
a hood formed on said diaphragm for preventing infra-red ray from being radiated to said support, absorbing said infra-red ray, and transferring heat resulted from the thus absorbed infra-red ray, to said diaphragm,
said hood being comprised of a sidewall standing on said diaphragm, and an upper plate extending outwardly of said sidewall from an upper edge of said sidewall,
wherein said sidewall is comprised of a first sidewall and a second sidewall, the second sidewall extending inwardly and upwardly of said diaphragm to overlap said diaphragm.

2. The thermal-type infra-red ray solid-state image sensor as set forth in claim 1, wherein said first sidewall and said second sidewall extend in a V-shaped fashion, said upper plate extending outwardly of said first sidewall.

3. The thermal-type infra-red ray solid-state image sensor as set forth in claim 2, further comprising a second upper plate extending inwardly of said second sidewall from an upper edge of said second sidewall, said second upper plate being formed with an opening through which said diaphragm is exposed.

4. The thermal-type infra-red ray solid-state image sensor as set forth in claim 3, wherein said second upper plate is formed centrally with said opening.

5. A thermal-type infra-red ray solid-state image sensor including at least one device for detecting infra-red ray, said device comprising:
a substrate including a signal-readout circuit;
a contact electrode formed on said substrate and electrically connected to said signal-readout circuit;
a diaphragm spaced away from and above said substrate, said diaphragm including an infra-red ray absorber absorbing infra-red ray to be heated, a temperature detector detecting a temperature of said infra-red ray absorber, and an electrode electrically connected to said temperature detector;
a support supporting said diaphragm such that said diaphragm is spaced above said substrate, and being at least partially composed of electrically conductive material to electrically connect said contact electrode to said electrode; and
a hood formed on said diaphragm for preventing infra-red ray from being radiated to said support, absorbing said infra-red ray, and transferring heat resulted from the thus absorbed infra-red ray, to said diaphragm,
said hood being comprised of, when vertically viewed, a first portion standing on said diaphragm and extending upwardly and outwardly of said diaphragm to cover said support with a space therebetween, and a second portion standing on said diaphragm and extending inwardly and upwardly of said diaphragm to overlap said diaphragm.

6. The thermal-type infra-red ray solid-state image sensor as set forth in claim 5, wherein said first and second portions stand on said diaphragm at a common location.

7. The thermal-type infra-red ray solid-state image sensor as set forth in claim 5, wherein said first portion is comprised of a first sidewall standing on said diaphragm and extending upwardly and a first upper plate extending outwardly of said diaphragm from an upper edge of said first sidewall, and said second portion is comprised of a second sidewall standing on said diaphragm and extending upwardly of said diaphragm, said first and second sidewalls being V-shaped.

8. The thermal-type infra-red ray solid-state image sensor as set forth in claim 7, further comprising a second upper plate extending inwardly of said diaphragm from an upper edge of said second sidewall.

9. A method of fabricating a thermal type infra-red ray solid-state image sensor, comprising the steps of:
  (a) forming a first sacrifice layer on a substrate except on a contact electrode formed on said substrate and electrically connected to a signal-readout circuit included in said substrate;
  (b) forming a diaphragm and a support on said first sacrifice layer, said support supporting said diaphragm such that said diaphragm is spaced above said substrate, and being at least partially composed of electrically conductive material to electrically connect said contact electrode to said diaphragm;
  (c) forming a second sacrifice layer outside said diaphragm and on said diaphragm in an island shape, such that a sacrifice portion of said second sacrifice layer is spaced above a center of said diaphragm;
  (d) depositing a material of which a hood is composed, on both said second sacrifice layer and said diaphragm, such that a sacrifice portion of said material is spaced above said diaphragm;
  (e) patterning said material to remove a part of said second sacrifice layer formed outside said diaphragm and a part of said second sacrifice layer formed on said diaphragm, to form said hood; and
  (f) removing said first and second sacrifice layers through openings of said material resulted from said step (e).

10. The method as set forth in claim 9, wherein said hood is formed in said step (e) to be comprised of a sidewall standing on said diaphragm, and an upper plate extending inwardly of said sidewall from an upper edge of said sidewall, said upper plate being formed with an opening through which said diaphragm is exposed.

11. The method as set forth in claim 10, wherein said upper plate is formed centrally with said opening.

12. The method as set forth in claim 9, wherein said hood is formed in said step (e) to be being comprised of, when vertically viewed, a first portion standing on said diaphragm and extending upwardly and outwardly of said diaphragm to cover said support with a space therebetween, and a second portion standing on said diaphragm and extending upwardly of said diaphragm.

13. The method as set forth in claim 12, wherein said second portion extends inwardly of said diaphragm.

14. The method as set forth in claim 12, wherein said first and second portions stand on said diaphragm at a common location.

15. The method as set forth in claim 12, wherein said first and second portions are V-shaped.

16. The method as set forth in claim 9, wherein said first sacrifice layer is composed of polyimide.

17. The method as set forth in claim 9, wherein said second sacrifice layer is composed of polyimide.

18. The method as set forth in claim 9, wherein said first sacrifice layer is composed of polysilicon.

19. The method as set forth in claim 9, wherein said second sacrifice layer is composed of polysilicon.

20. The method as set forth in claim 9, wherein said first sacrifice layer is composed of aluminum.

21. The method as set forth in claim 9, wherein said second sacrifice layer is composed of aluminum.

22. The method as set forth in claim 9, wherein said diaphragm and said support are composed of silicon oxide, and said first and second sacrifice layers are composed of silicon nitride.

23. The method as set forth in claim 9, wherein said diaphragm and said support are composed of silicon nitride, and said first and second sacrifice layers are composed of silicon oxide.

* * * * *

UNITED STATES PATENT AND TRADEMARK OFFICE
CERTIFICATE OF CORRECTION

PATENT NO.         : 7,276,698 B2
APPLICATION NO. : 11/085183
DATED              : October 2, 2007
INVENTOR(S)        : Shigeru Tohyama Page 1 of 1

It is certified that error appears in the above-identified patent and that said Letters Patent is hereby corrected as shown below:

Col. 2, line 62, after "to", insert --avoid--

Col. 4, line 37, delete "of", first occurrence, insert --the--

Signed and Sealed this

Twenty-first Day of October, 2008

JON W. DUDAS
*Director of the United States Patent and Trademark Office*